Oct. 3, 1933.  W. H. SILVER  1,928,952
DISK TILLER
Filed Sept. 26, 1930   2 Sheets-Sheet 2
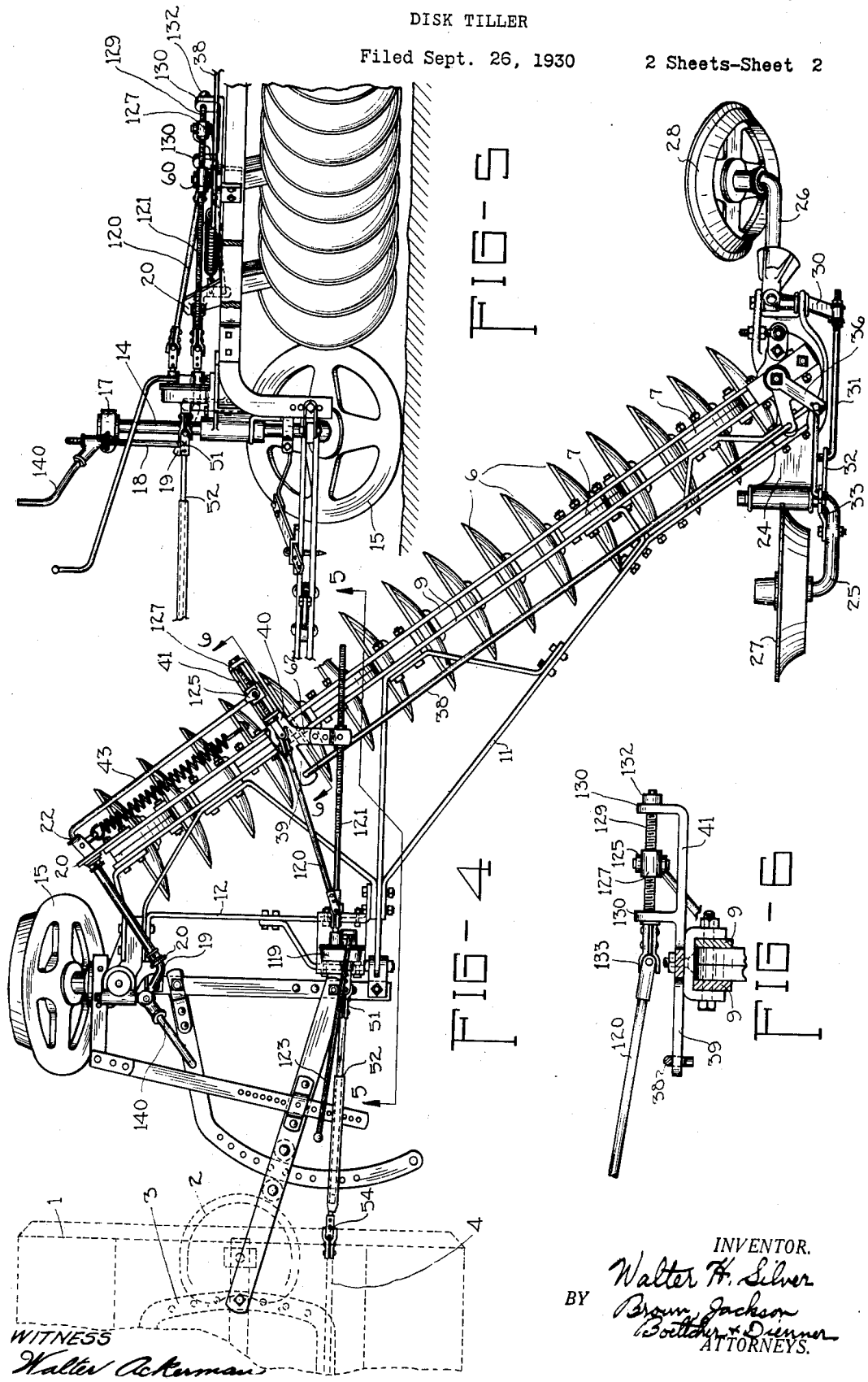
INVENTOR.
Walter H. Silver
BY Brown, Jackson, Boettcher & Dienner
ATTORNEYS.

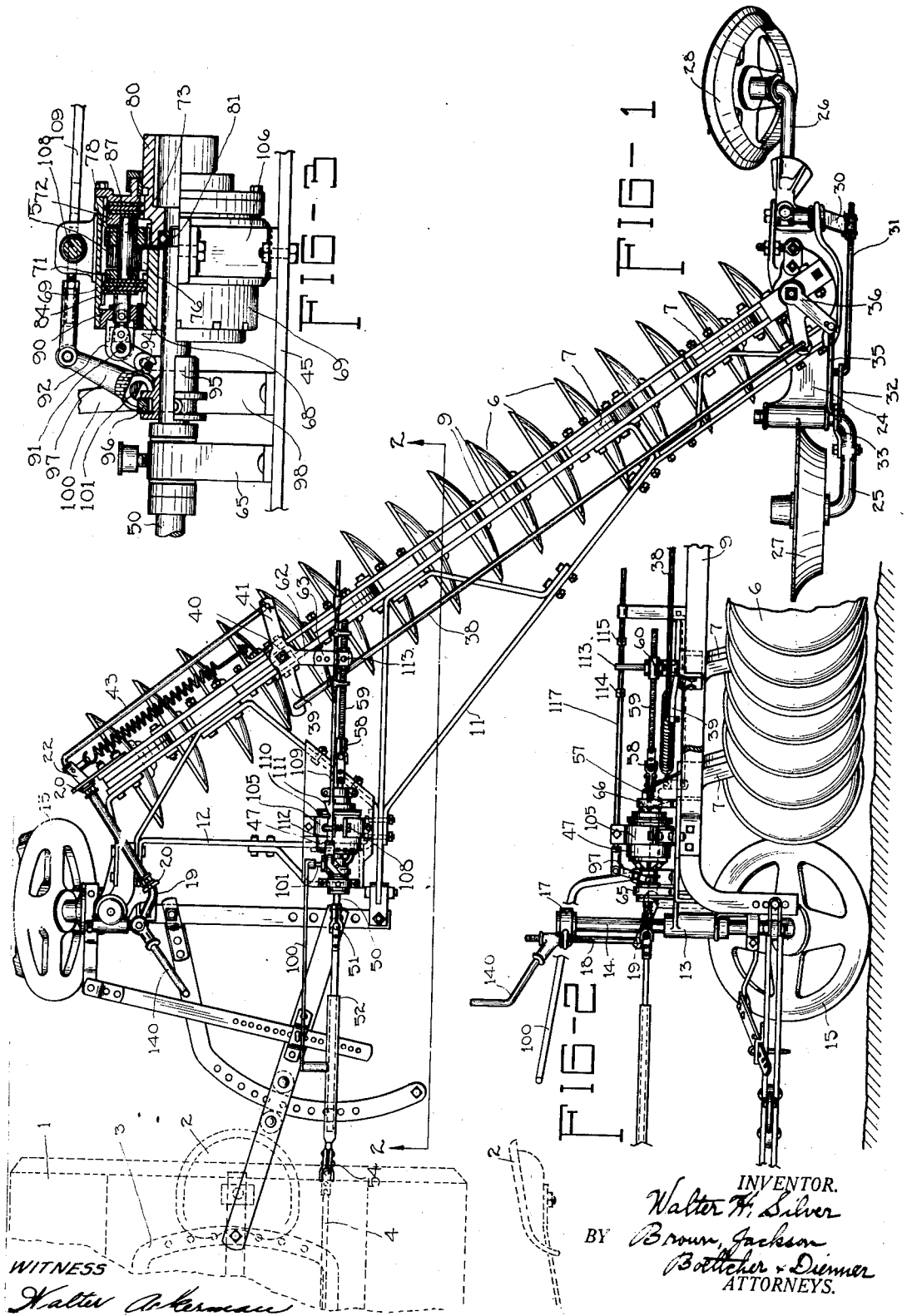

Patented Oct. 3, 1933

1,928,952

UNITED STATES PATENT OFFICE 1,928,952

DISK TILLER

Walter H. Silver, Moline, Ill., assignor to Deere & Company, Moline, Ill., a corporation of Illinois Application September 26, 1930
Serial No. 484,580

23 Claims. (Cl. 97—50)

The present invention relates to agricultural implements of the type characterized by a series of disks usually arranged in axial alignment, all facing in the same direction, and with the common axis of the disks extending at an angle to the line of draft of the implement. Such implements, commonly referred to as disk tillers, are extensively used as disk plows in certain soils, particularly where a comparatively shallow plowing depth suffices in preparing the seed bed. An implement of this general type is shown and described in my pending application, Serial No. 406,179, filed November 11, 1929.

In prior devices of this type it has been customary to provide separate hand-operated levers or screw threaded adjusting means on the frame adjacent to each of the three wheels for adjusting the frame of the implement vertically relative to the wheels to raise or lower the disks to transport or operative position. This, of course, necessitated three separate adjustments which require considerable time and is frequently inconvenient to effect.

The principal object of my present invention is the provision of new and improved power-operated means for simultaneously raising and lowering the frame vertically relative to all of its supporting wheels, which mechanism is preferably operated by means of the power take-off of the tractor. It is also one of the important features of my present invention that new and improved means are provided for leveling, that is, adjusting the vertical position of one end of the frame relative to the other end, the implement by power actuated means operated from the motor of the tractor by which the implement is propelled. Preferably the leveling means, as well as the raising and lowering means, can be actuated from the operator's station on the tractor and regardless of whether the tractor and implement are stationary or are moving.

Another feature of considerable importance in the present embodiment of my invention is that the raising and lowering means is so constructed and arranged that both ends of the implement frame are raised to substantially the same height relative to the ground irrespective of the position of the leveling mechanism, that is, the leveling mechanism may be at one extreme or the other of its range of adjustment whereby one end of the frame is higher or lower than the other, yet when the power-operated raising and lowering mechanism is actuated to raise the frame of the implement to transport or inoperative position, both ends of the frame are brought to substantially the same height above the ground.

In comparison with tillers of the prior art, as referred to above wherein three separate hand-operated adjusting means are provided, my present invention exhibits a number of advantages. With these prior devices when the operator desired to adjust the level of his implement or to raise the tilling tools to inoperative position it was necessary for him to dismount and to separately operate each of the adjusting devices. If, for example, the effect of such adjustment upon the operation of the tilling tools was to be observed, it was necessary for the operator to start up the implement and operate the same a short distance to observe the effect of the change just made. If such change was not entirely satisfactory and additional adjustment required it was necessary to again stop the implement and for the operator to dismount and manually shift the adjusting means.

On the other hand, in the machine constructed according to the present invention, to effect either a leveling adjustment or to raise and lower the tilling tools, relative to the ground all the operator has to do is to position a control lever which is accessible from the operator's station on the tractor, and to utilize the power of the tractor, whether moving or stationary, to effect the extent of adjustment required. Since the adjusting means is capable of being operated when the implement is in operation and moving across the field it is a simple matter to bring the implement to the required adjustment with practically no expenditure of energy on the part of the operator and with substantially no loss in time.

Other objects and advantages of the present invention will be apparent to those skilled in the art after a consideration of the following detailed description of the preferred embodiment of the same, taken in conjunction with the accompanying drawings, in which:

Figure 1 is a top plan view showing a disk tiller of the conventional type with which is embodied the power-operated adjusting mechanism;

Figure 2 is a fragmentary side elevation corresponding substantially to a view taken along the line 2—2 of Figure 1;

Figure 3 is an enlarged detail view showing the reverse gear mechanism;

Figure 4 is a top plan view similar to Figure 1 but showing the application of a slightly modified form of reverse gearing;

Figure 5 is a fragmentary side elevation view taken substantially along the line 5—5 of Figure 4; and Figure 6 is an enlarged fragmentary detail view, taken along the line 6—6 of Figure 4 and illustrating the adjusting means for leveling the tiller frame.

Referring now to the drawings, more particularly to Figures 1 to 3, the reference numeral 1 indicates the tractor which may be of the usual type, having an operator's station in the form of a seat 2, a draft connection 3, and a power take-off device represented in its entirety by the reference numeral 4.

The implement with which the present invention is preferably embodied is in the nature of a disk tiller having a plurality of axially aligned disks 6 journaled in a number of standards 7, the upper ends of which are secured to and supported between a pair of diagonally extending frame bars 9. The frame bars 9, together with associated braces 11 and 12 constitute the frame of the implement. The forward end of the frame of the tiller has secured thereto a journal casting 13 in which is rotatably journaled the spindle 14 carrying the front furrow wheel 15 mounted upon a laterally extended portion thereof. At the upper end of the spindle 14 is a swivel head 17 to which is secured an adjusting screw 18, the lower end of which is connected to a swinging crank 19 journaled in brackets 20 secured to the frame of the tiller. The swinging crank 19 includes a rear crank arm 22, see Figure 1, for a purpose later to be described.

The rear ends of frame bars 9 are connected to and mounted upon a rear truck casting 24 having at its forward and rear ends journal bosses to receive, respectively, swinging axles 25 and 26, the latter carrying the rear land wheel 27 and the rear furrow wheel 28, as best indicated in Figure 1.

As is well understood in the art, fore and aft swinging of the crank axles 25 and 26, together with movement of the swinging crank 19, is effective to raise and lower the frame of the tiller relative to its supporting wheels 15, 27, and 28. Crank axles 25 and 26 are link connected to swing together by means of structure now to be described. Referring to Figure 1 an arm 30 is connected to swing with the crank axle 26, and projecting forwardly therefrom is a tension link 31 adjustably secured to arm 30. The link 31 is connected to an arm 32 which, in turn, is connected to an arm or bracket 33 rigidly connected to and swinging with the crank axle 25. Arm 33 is provided with an aperture receiving the laterally turned end of a link 35 which at its rearward end is pivoted to one arm of a bell crank 36 journaled upon the rear ends of frame bars 9. The other arm of bell crank 36 is provided with an actuating link 38 extending substantially parallel with frame bars 9 and at its forward end is connected to one arm 39 of a three-armed lever 40 journaled upon the frame bars 9 at a point somewhat near the forward ends thereof. The second arm 41 of lever 40 is connected by means of a link 43 to the arm 22 so that the swinging link 19 and crank axles 25 and 26 are adapted to be simultaneously operated by the swinging lever 40.

The means for swinging the lever 40 will now be described. Mounted upon a plate 45, which is secured to the frame of the tiller, is a reverse gear mechanism indicated in its entirety by the reference numeral 47. The driving shaft 50 for the reverse gear mechanism 47 extends forwardly and is secured to a universal joint 51 which serves to connect shaft 50 with the telescoping shaft 52, the forward end of which is provided with a second universal joint 54 serving to connect the same with the power take-off 4 of the tractor 1. The driven shaft 57 of the reverse gear mechanism 47 extends rearwardly therefrom and is provided with a universal joint 58 and a screw shaft 59 which is threaded into a swiveled nut member 60 carried by the third arm 62 of swinging lever 40. Preferably the arm 62 is provided with a strap 63 or other means affording a forked end for the arm 62 between the ends of which the nut member 60 is received.

The operation of the mechanism so far described is substantially as follows. Rotation of power take-off member 4 in one direction is transmitted through telescoping shaft 52 to the reverse gear mechanism 47 which, in turn, may be adjusted to turn screw shaft 59 in either direction at the will of the operator. Preferably, also, the reverse mechanism 47 includes a neutral position in which no rotation is transmitted to the screw shaft 59. Rotation of the screw shaft, however, by virtue of its threaded connection with the nut member 60 swiveled to arm 62 of lever 40, serves to swing the lever 40 in one direction or the other, according to the direction of rotation of shaft 59, thereby raising or lowering the tiller frame relative to its supporting wheels and the ground.

The reversing mechanism 47 just referred to forms no part of the present invention. In order, however, that the operation of the present invention may be better understood the reversing mechanism 47 will be described. Extending from plate 45, which is secured to the frame of the tiller, is a pair of brackets 65 and 66 in which is rotatably journaled shafts 50 and 57 respectively by means of bearings of the usual type carried by the brackets. A sleeve 68 is keyed to shaft 50 at the rear end thereof and is rotatably positioned within a housing 69, best shown in Figure 3. In the space between the housing 69 and the sleeve 68 two disk rings 71 and 72 are positioned. These disks are provided with teeth in the outer periphery thereof which engage in key-ways formed in the inner circumference of the housing 69 whereby these disk rings may move axially with respect to the housing 69 but are restrained from rotating relatively thereto. The disk rings 71 and 72 are connected together by means of short shafts 73, these shafts 73 being arranged in two sets of three shafts each. On each of one set of shafts a planet gear 75 is journaled, the teeth of which engage with teeth 76 cut on the rear end of sleeve 68. The three planet gears 75 therefore mesh with and rotate around the sleeve 68 as a sun gear.

On each of the other set of shafts, a gear 78 is journaled, the teeth of which mesh with the teeth of an adjacent gear rotatable on the same shaft as gear 75 and with teeth formed on the inner end of a sleeve 80 which forms a part of the driven shaft 57 and is journaled on the reduced end 81 of shaft 50 and in the housing 69.

Friction disks 84 are arranged between sleeve 68 and housing 69 and are positioned against disk ring 71, while another set of friction disks 87 is arranged between sleeve 80 and the rear end of housing 69 and are positioned against disk ring 72. As will be understood by referring to Figure 3, these two sets of friction disks 84 and 87 are adapted to rotatably secure housing 69 to sleeve 68 and to sleeve 80, respectively. That is, when the disks 84 and 87 are pressed together the sleeves 68 and 80 are connected together, through housing 69, and rotate as a unit.

The means for pressing the disks together comprises a plurality of plungers 90 axially movable in housing 69 and each of which is actuated by means of a bell crank 91 pivoted to brackets 92 on housing 69. The inner ends or arms of the bell cranks 91 are slotted and are engaged by pins 94 provided on a grooved collar 95 axially movable along shaft 50. Controlled means for moving the collar 95 includes the thrust collar 96 and the shifting fork 97 journaled in a bracket 98 mounted on plate 45. The shifting fork 97 is rocked on its journal support by means of a forwardly extending control lever 100 connected with the member 97 through rockshaft 101. As is best shown in Figure 2, the control lever 100 is formed to extend forwardly adjacent the operator's station 2 on the tractor so as to be accessible to the operator for convenient control of the reverse gear mechanism.

A brake band 105 surrounds the housing 69 and is secured to a bracket 106 mounted on plate 45. Normally, the housing 69 is rotatable within the brake band 105, but the latter may be actuated to cause the same to grip the housing and to prevent its rotation. The means for clamping the brake band 105 around the housing 69 includes a bolt 108 passed through upturned ends of the brake band and which is provided with an elongated eye through which is positioned a sliding cam member 109 connected to the upper end of the shift fork 97, as best shown in Figure 3. The cam member 109 is formed with a recess 110, a cam portion 111, and a dwell portion 112. These portions and the recess 110 are so arranged that when the bolt 108 lies against the dwell portion 112 the brake band 105 is just out of engagement with the housing 69 so that the latter is free to rotate with respect thereto. When, however, the cam member 109 is moved forwardly by the corresponding movement of the shift fork 97 so as to bring the cam portion or wedge 111 into engagement with bolt 108 the latter is caused to contract the brake band 105 about housing 69 to clamp the same and to prevent its rotation. The recess 110 is provided for the purpose of defining a neutral point in the movement of the cam member 109 and the shift fork 97.

Referring now to Figure 3, it will be observed that when the upper end of the shift fork 97 and the cam member 109 are thrown rearwardly bolt 108 contacts with the dwell portion 112 of the member 109. In this position, as just indicated, the housing 69 is free to rotate, and since such movement of shift fork 97 rearwardly causes plungers 90 to engage the friction disks 84 and 87 the disk rings 71 and 72, together with associated planet gears, are constrained to rotate in unison. Driving effort is therefore transmitted from shaft 50 directly to sleeve 80 and screw shaft 59, whereupon the traveling nut 60 moves along shaft 59 to cause swinging movement of the lever 40.

When shift fork 97 and member 109 are thrown forwardly, that is, in a position where the cam portion 111 engages bolt 108, the brake band 105 grips housing 69 and effectively holds it stationary. Under these conditions the plungers 90 are withdrawn from friction disks 84 and 87 so that now rotation of shaft 50 is transmitted through sleeve 68 and teeth 76 to planet gears 75. From these gears the drive is transmitted to planet gears 78 and from thence through sleeve 80 to shaft 59, but now in a direction opposite to the direction of shaft 50. In this case, therefore, the traveling nut 60 is pulled along shaft 59 in a direction opposite from the direction in which it moves when the shift fork 97 is in the position indicated in Figure 3, hence the swinging lever 40 is rocked in the opposite direction. When the lever 100 is rocked to position the recess 110 in the eye of bolt 108 the brake band 105 is withdrawn from engagement with housing 69 and at the same time, plungers 90 are withdrawn from housing 69 a sufficient amount to release friction disks 84 and 87. In this position, therefore, the rotation of shaft 50 will drive sleeve 68 but the housing 69 will rotate freely with respect thereto so that no drive is transmitted to sleeve 80 and screw shaft 59.

In order that continued operation of shaft 59, either in one direction or the other, will not cause breakage of parts the reverse gear mechanism is provided with automatic means for interrupting the drive upon the swinging arm 40 being moved through a predetermined extent. This means takes the form of a vertical stem 113 mounted upon the traveling nut 60 and in a position to contact with stops 114 and 115 secured to the rearward extension 117 of the cam member 109. As will be obvious, when member 60 has reached a given position on screw shaft 59, either in one direction or the other, the stem 113 will contact with the corresponding stop 114 or 115 and cause extension 117 to shift the cam member 109 back to neutral position so as to stop further actuation of screw shaft 59.

The modification shown in Figures 4, 5, and 6 differs from the construction shown in Figures 1, 2 and 3 merely in that a reversing mechanism 119 of slightly different form has been substituted for the reversing mechanism shown in Figures 1, 2 and 3. Since the details relating to the tractor and the tillage implement per se are practically the same like parts have been indicated by like reference characters. Like the modification illustrated in Figures 1, 2 and 3, the reverse gear mechanism shown in Figures 4, 5, and 6 form per se no part of the present invention and has not, therefore, been shown in complete detail. For a complete disclosure of the reversing mechanism in all its details reference may be had to the copending application of Charles H. White, Serial No. 287,942, filed June 25, 1928. For purposes of the present disclosure it is sufficient to note that the drive from driving shaft 52 is transmitted at the will of the operator to either of two driven shafts, designated by reference numerals 120 and 121 respectively. Not only may the drive from driving shaft 52 be directed to either of these two driven shafts at the will of the operator but either of these driven shafts may be rotated in either direction. Like the reverse mechanism illustrated in Figure 1, the reverse mechanism of Figure 4 is driven from the power take-off 4 of the tractor 1. The operation of the reverse gear mechanism is controlled by means of a control lever 123 extending forwardly to a position adjacent the driver's seat 2 on the tractor.

Driven shaft 121 is connected by means of a screw and nut connection to the third arm 62 of the swinging lever 40 in substantially the same manner as indicated in Figure 1, the traveling nut 60 being arranged on shaft 121 in the same manner as it is arranged on shaft 59 in Figure 1. In this case, however, the vertical stem 113 is dispensed with because, as more clearly shown in the copending application referred to above, the reversing gear mechanism 119 itself embodies automatic stop means for interrupting the drive when the lever 40 has been moved a predetermined extent.

Referring now more particularly to Figure 4, it will be noted that the link 43 is not directly connected to the arm 41 of lever 40, as shown in Figure 1, but the link 43 is provided with a forked end 125 to pivotally receive the traveling nut 127 which is threaded upon a second screw shaft 129 journaled in vertical extensions 130 formed on arm 41 of the swinging lever 40. A collar 132 is secured to the outer or rearward end of screw shaft 129 while the forward end of the same is provided with a universal joint 133 connecting the shaft to driven shaft 120. Rotation of the driven shaft 120 is operative, therefore, to shift the traveling nut 127 in either direction along screw shaft 129 depending upon the direction of rotation of the driven shaft 120.

The proportions of links 38 and 43 and arm 41, upon which the screw shaft 129 and traveling nut 127 are mounted, are so constructed and arranged that in the raised position of the tiller the link 43 is substantially at right angles to screw shaft 129. The purpose of this arrangement will be obvious when it is considered that if in this position the screw shaft 129 is operated to move the traveling nut 127 in one direction or the other practically no swinging movement will be imparted to the arm 22 secured to swinging link 19, whereas when the tiller is in lowered position, that is, when the frame and tilling tools carried thereby are in their lowered position, the screw shaft 129 extends at an angle to the link 43 so that rotation of the screw shaft 129 effects a swinging of the arm 22 and hence raises or lowers this end of the tiller frame. Thus, by operating the screw shaft 129 in either one or the other directions the tiller may be leveled and the front end adjusted vertically independently of the rear end. However, due to the fact that link 43 is substantially at right angles to screw shaft 129 when the tiller frame is in its raised position, both ends of the tiller are raised to substantially the same height irrespective of the position of the leveling mechanism, that is, irrespective of the position of the traveling nut 127 on screw shaft 129.

In the operation of the device illustrated in Figures 4, 5, and 6, when the operator desires to raise or lower the tiller frame to bring the tillage tools to transport or operative position all he has to do is to shift the control lever 123 to the proper place to drive the screw shaft 121 in the correct direction to run the traveling nut 60 forward or backward along the screwshaft. Since the reverse gear mechanism 119 is connected with the power take-off 4 of the tractor this raising or lowering operation may be effected either when the tractor is moving over the field or when the same is stationary. When the operator desires to level the implement or to position certain of the tillage tools nearer or farther from the surface of the ground all he has to do is to shift the control lever 123 to the proper place to impart rotation to shaft 120 in the proper direction, to run the traveling nut 127 outwardly along screw shaft 129 to lower the forward tools or to run the traveling nut 127 inwardly toward the pivot of swinging link 49 to raise the forward tools.

It is to be noted that in connection with the front furrow wheel 15 the usual crank screw adjusting means 140 is provided by means of which the position of the front wheel spindle may be adjusted relative to the swinging link 19. In the modification illustrated in Figures 1, 2, and 3 this forms the means for leveling the implement whereas in the modification shown in Figures 4, 5, and 6 this feature may be dispensed with although I have shown it as preferably embodied in the construction illustrated in Figures 4, 5, and 6 since it serves the useful purpose of augmenting the leveling adjustment effected by the screw shaft 129 and associated structure.

While I have shown and described the preferred embodiment of the present invention it is to be understood that my invention is not to be limited to the specific structure thus shown and described but that, in fact, widely different means may be employed in the practice of the broader aspects of my invention.

What I claim, therefore, and desire to secure by Letters Patent is:

1. An agricultural implement adapted to be propelled by a tractor having a motor and a power take-off driven thereby, said implement being connected with the tractor and including supporting wheels and a plurality of tools movable vertically with respect to said wheels, a uni-directional power transmitting member operatively connected with the power take-off of the tractor, reversible gear mechanism mounted on said implement and driven by said member, and means operated by the reversible gear mechanism for raising and lowering said tools relative to the supporting wheels.

2. An agricultural implement adapted to be propelled by a tractor having a motor and a power take-off driven thereby, said implement connected with the tractor and including supporting wheels and a tool carrying frame movable vertically with respect to said wheels, a uni-directional power transmitting member operatively connected with the power take-off of the tractor, means connected with said member for raising one side of the implement frame relatively to the supporting wheels, and means also connected with said member for simultaneously raising both sides of the implement frame relative to said supporting wheels.

3. In an implement adapted to be driven by a tractor having a power take-off, the combination of a frame, a front supporting wheel therefor, means including a swinging crank for supporting one end of the frame on said wheel, wheel supporting means for the other end of said frame and including a crank axle and a wheel journaled thereon, a lever mounted on the frame and link-connected with the swinging crank and the crank axle, and means adapted to be actuated by said power take-off for swinging said lever to raise and lower the frame relative to its supporting wheels.

4. In an implement adapted to be driven by a tractor having a power take-off, the combination of a frame, a front supporting wheel therefor, means including a swinging crank for supporting one end of the frame on said wheel, wheel supporting means for the other end of said frame and including a crank axle and a wheel journaled thereon, a lever mounted on the frame and link-connected with the swinging crank and the crank axle, and means including a uni-directional shaft and optionally reversible gear means adapted to be actuated by said power take-off for swinging said lever to raise and lower the frame relative to its supporting wheels.

5. An agricultural implement adapted to be propelled by a tractor, comprising a wheel supported frame, tilling tools carried thereby, a rotating shaft adapted to extend between the tractor and the implement and adapted to derive its power from the motor of the tractor, screw means for adjusting the vertical position of the frame relative to the ground, and means for selectively establishing a driving connection in either direction between said rotating shaft and said screw means.

6. An agricultural implement adapted to be propelled by a tractor, comprising a wheel supported frame, tilling tools carried thereby, a rotatable shaft adapted to extend between the tractor and the implement and adapted to derive its power from the motor of the tractor, means for transforming rotary motion of said shaft into vertical movement of said frame for adjusting the vertical position of the frame relative to the supporting wheels, and control means for selectively establishing a driving connection in either direction between said rotatable shaft and said first mentioned means.

7. An agricultural implement adapted to be propelled by a tractor, comprising a wheel supported frame, tilling tools carried thereby, a rotating shaft adapted to extend between the tractor and the implement and adapted to derive its power from the motor of the tractor, screw means for adjusting the vertical position of the frame relative to the supporting wheels therefor, control means operable from the driver's position on the tractor for selectively establishing a driving connection in either direction between said rotating shaft and said screw means, and means for automatically interrupting said connection when the frame has been shifted a predetermined amount.

8. A power lift agricultural implement adapted to be driven by a tractor, comprising a frame having supporting wheels and adapted to be connected with the tractor, a plurality of soil tilling tools carried by said frame, and power driven means for simultaneously lifting said tools out of operative position relative to all the supporting wheels and including independent power driven means for adjusting the frame relative to one of said wheels, said power driven means each being actuated by the motor of the tractor.

9. A power lift agricultural implement adapted to be driven by a tractor, comprising a wheeled frame adapted to be connected with a tractor, a plurality of soil tilling tools carried by said frame, power operated crank means mounted on said frame, means including links connected to said crank means for simultaneously raising both ends of the frame relative to the ground, and means for shifting the position of one of said links along a predetremined line of adjustment relative to said crank means, said last named means being adapted to be driven by the power of the tractor and said line of adjustment being so related to said one link as to lie substantially at right angles thereto when the crank means has been actuated to move the frame to its raised position.

10. A power lift agricultural implement adapted to be driven by a tractor, comprising a frame having supporting wheels and adapted to be connected with a tractor, a plurality of soil tilling tools carried by said frame for vertical movement relative to said wheels, and reversible gear driven mechanism adapted to be driven by the power of the tractor and operative to raise and lower said tools relative to said supporting wheels.

11. An agricultural implement adapted to be propelled by a tractor, comprising a wheel supported frame, tilling tools carried thereby, a rotating shaft adapted to extend between the tractor and the implement and adapted to derive its power from the motor of the tractor, screw means for adjusting the vertical position of the frame relative to the supporting wheels, separate screw means for adjusting the mechanical advantage of the first named screw means relative to the supporting wheel at one side of said frame, and reversible gear mechanism for selectively establishing a driving engagement between either of said screw means and in either direction.

12. A disk tiller of the class described comprising, in combination, a diagonally disposed frame, a front furrow wheel adjustably connected with the frame, rear wheel supporting means for the frame and including crank axles for the wheels journaled in the frame, links extending parallel with the frame, one link connected with said crank axles and another connected with the front wheel adjusting means therefor, a bell crank pivotally mounted on the frame intermediate the ends thereof and having its arms connected with said links, and means for swinging the bell crank to raise and lower the frame relative to its supporting wheels.

13. A disk tiller of the class described comprising, in combination, a diagonally disposed frame, a front furrow wheel adjustably connected with the frame, rear wheel supporting means for the frame and including crank axles for the wheels journaled in the frame, links extending parallel with the frame, one link connected with said crank axles and another connected with the front wheel adjusting means therefor, a bell crank pivotally mounted on the frame intermediate the ends thereof and having its arms connected with said links, adjustable means connecting one of the links with the bell crank to effect an independent adjustment of the corresponding end of the frame, and means including reversible means for swinging the bell crank in either direction to simultaneously raise or lower both ends of the frame.

14. In a wheel supported disk tiller adapted to be propelled by a tractor having a power take-off, cranks for positioning the supporting wheels relative to the frame to raise and lower the tilling tools, links connected with said cranks and extending longitudinally of the frame, a three-armed lever pivotally mounted on the frame to turn about a vertical axis, two of said arms being connected with said links, traveling nut and screw means operatively connected with the other of said arms, and optionally operated reversible gear mechanism establishing a driving connection between the power take-off and said screw means.

15. In a wheel supported disk tiller adapted to be propelled by a tractor having a power take-off, cranks for positioning the supporting wheels relative to the frame, link means connecting the cranks and extending along the frame, a swinging lever pivoted to the frame and connected with the link means, gear mechanism driven by said power take-off for optionally swinging said lever in either direction for raising or lowering the frame.

16. In a wheel supported disk tiller adapted to be propelled by a tractor having a power take-off, cranks for positioning the supporting wheels relative to the frame, a swinging lever pivotally mounted on said frame, means connecting the lever to the crank adjacent one end of the frame, a link connected with the crank at the other end of the frame and pivotally carrying a traveling nut, a rotatable screw shaft threaded into said nut and journaled on the lever, said screw shaft arranged to extend angularly with respect to said link when the frame is lowered so that rotation of said screw shaft will be effective to level the tiller, and power operated gear means for selectively swinging the lever and driving said screw shaft.

17. In a wheel supported disk tiller adapted to be propelled by a tractor having a power take-off, cranks for positioning the supporting wheels relative to the frame, a swinging lever pivoted to the frame, links connecting each of said wheel cranks to the lever, one of said links having a swiveled nut threadedly received by a screw shaft journaled on said lever, said screw shaft arranged to extend substantially at right angles to said one link when the frame is raised so that the raised position of the frame is substantially level irrespective of the adjustment of said screw shaft and nut, and selectively actuated power driven means connected with said power take-off for driving said screw shaft in either direction and for swinging said lever.

18. In an agricultural implement having a frame with swinging crank axles and supporting wheels thereon, and adapted to be propelled by a motor driven tractor, the combination of means including a selectively controlled gear set for optionally swinging the crank axles in either direction to raise or lower the frame.

19. In an agricultural implement having a frame with swinging crank axles and supporting wheels thereon, and adapted to be propelled by a motor driven tractor, the combination of power driven means including a selectively controlled gear set mounted on the frame and having a control member operated from the tractor, and means associated therewith for swinging one of said crank axles independently of the other when the frame is in its lowered position, said gear set and gear means being adapted to be driven from the motor of the tractor.

20. An agricultural implement adapted to be propelled by a tractor, comprising a wheel supported frame, tilling tools carried thereby, a rotatable shaft adapted to extend between the tractor and the implement and adapted to derive its power from the motor of the tractor, means for transforming rotary movement of said shaft into vertical movement of said frame for adjusting the vertical position of the frame relative to the supporting wheels and the ground, and control means on the implement frame and including a member arranged adjacent the driver's position on the tractor for selectively establishing a driving connection in either direction between said rotatable shaft and said first mentioned means.

21. A power lift implement adapted to be driven by a tractor, comprising a frame having supporting wheels and adapted to be connected with the tractor, a soil tilling tool carried by said frame for vertical movement relative to said supporting wheels, a power driven shaft journaled on said frame and driven from the tractor, and means driven from said shaft for lifting said tool out of operative position and including independent means deriving its power from said shaft and operative for adjusting the position of said frame relative to said wheels to level said tool.

22. A power lift agricultural implement adapted to be driven by a tractor, comprising a frame mounted upon supporting wheels for vertical movement relative thereto and adapted to be connected with the tractor, a plurality of soil tilling tools carried by said vertically movable frame, and power driven means for simultaneously lifting said tools out of operative ground engaging position and including independent power driven means for adjusting the position of said frame relative to said supporting wheels to level said tools, said two power driven means including common operating parts.

23. An agricultural implement comprising supporting wheels, a ground working tool movable vertically relative to said wheels, a uni-directionally rotating shaft, and selectively controlled means driven by said shaft for optionally raising and lowering said tool relative to all of said wheels or to one of said wheels independently.

WALTER H. SILVER.